United States Patent
Lin et al.

(10) Patent No.: US 6,865,438 B1
(45) Date of Patent: Mar. 8, 2005

(54) METHOD OF USING TIME INTERVAL IN IC FOUNDRY TO CONTROL FEED BACK SYSTEM

(75) Inventors: Shui-Tien Lin, Kinmen (TW); Yi-Chuan Lo, Hsinchu (TW); Jimmy Hu, Hsinchu (TW); Chen-Yu Chang, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 131 days.

(21) Appl. No.: 10/261,301

(22) Filed: Sep. 30, 2002

(51) Int. Cl.⁷ ............................................. G06F 19/00
(52) U.S. Cl. .................... 700/121; 700/95; 700/117; 438/5
(58) Field of Search ................ 438/5; 700/90, 700/95, 117, 121; 716/4

(56) References Cited

U.S. PATENT DOCUMENTS

| | | | |
|---|---|---|---|
| 6,245,581 B1 | 6/2001 | Bonser et al. | 438/8 |
| 6,248,602 B1 | 6/2001 | Bode et al. | 438/14 |
| 6,266,144 B1 | 7/2001 | Li | 356/401 |
| 6,304,999 B1 | 10/2001 | Toprac et al. | 716/4 |

*Primary Examiner*—Jayprakash N. Gandhi
(74) *Attorney, Agent, or Firm*—Haynes and Boone, LLP

(57) ABSTRACT

An advanced process control method using time interval between lots of a particular product to control the weighting of feedback data is described. A plurality of products are fabricated wherein the products are tracked by the process control method based on product type, for example. Variation in a parameter is detected. The adjustment speed of a process recipe is determined based on a time interval weighting wherein the time interval is defined as the time between processing of lots of the same product type. The process recipe is updated at the determined adjustment speed to decrease variation of the parameter.

25 Claims, 1 Drawing Sheet and# METHOD OF USING TIME INTERVAL IN IC FOUNDRY TO CONTROL FEED BACK SYSTEM

BACKGROUND OF THE INVENTION (1) Field of the Invention

The present invention relates to the fabrication of integrated circuit devices, and more particularly, to an advanced process control system using time interval weighting in the fabrication of integrated circuit devices.

(2) Description of the Prior Art

Run by Run (RBR) feedback control schemes have been used widely to control and monitor the semiconductor manufacturing processes. Statistical control is combined with feedback control and uses data from past runs to adjust the recipe for the next run. This method offers the potential for reducing process variability caused by equipment aging, chemical depletion, or fluctuation in ambient conditions with a minimal cost. Integrated device manufacturers use Advanced Process Control (APC) systems to control processing. These types of factories have a very high throughput of a few products. However, there had been no APC theory developed for foundries which make a large number of mixed products, but relatively few of each particular product. A more suitable algorithm must be found for the feed back system for an integrated circuit foundry.

U.S. patent application Ser. Nos. 10/313,501 and 10/749,698 respectively filed on Dec. 6, 2002 and Dec. 31, 2003 teach multivariate run by run process control systems for IC foundries. U.S. Pat. No. 6,304,999 to Toprac et al shows a feedback/feed forward process control system including overlay control. U.S. Pat. No. 6,266,144 to Li teaches a feedback control method for a stepper/scanner. U.S. Pat. No. 6,248,602 to Bode et al discloses a method to store control input parameters such as for overlay control in a photolithography process, process a lot of devices, collect and analyze data for the lot, and perform automated rework based on the data analysis. U.S. Pat. No. 6,245,581 to Bonser et al teaches a method of measuring critical dimension, analyzing the measurement, and performing a secondary etch process based on the analysis. It is desired to find a better way to control feedback data for a foundry situation.

SUMMARY OF THE INVENTION

Accordingly, it is a primary object of the invention to provide an advanced process control system for an integrated circuit foundry.

Another object of the invention is to provide an advanced process control system using time interval between old and new lots of the same product to define the speed of feedback correction.

Yet another object is to provide a new concept of rapid mode and gradual mode in an advanced process control system.

Yet another object is to provide a new concept of rapid mode and gradual mode in an advanced process control system using time interval between old and new lots of the same product to define the speed of feedback correction.

A further object is to provide an advanced process control method to correct critical dimension and overlay in an photolithography process.

A still further object is to provide an advanced process control method using time interval between lots of a particular product to control the weighting of feedback data.

Another object of the invention is to provide an advanced process control method using time interval between lots of a particular product to control the weighting of feedback data in a critical dimension and overlay system.

In accordance with the objects of the invention, an advanced process control method using time interval between lots of a particular product to control the weighting of feedback data is achieved. A plurality of products are fabricated wherein the products are tracked by the process control method based on product type. Variation in a parameter is detected. The adjustment speed of a process recipe is determined based on a time interval weighting wherein the time interval is defined as the time between processing of lots of the same product type. The process recipe is updated at the determined adjustment speed to decrease variation of the parameter.

BRIEF DESCRIPTION OF THE DRAWINGS

In the accompanying drawings forming a material part of this description, there is shown.

DESCRIPTION OF THE PREFERRED EMBODIMENTS

Figure 1:
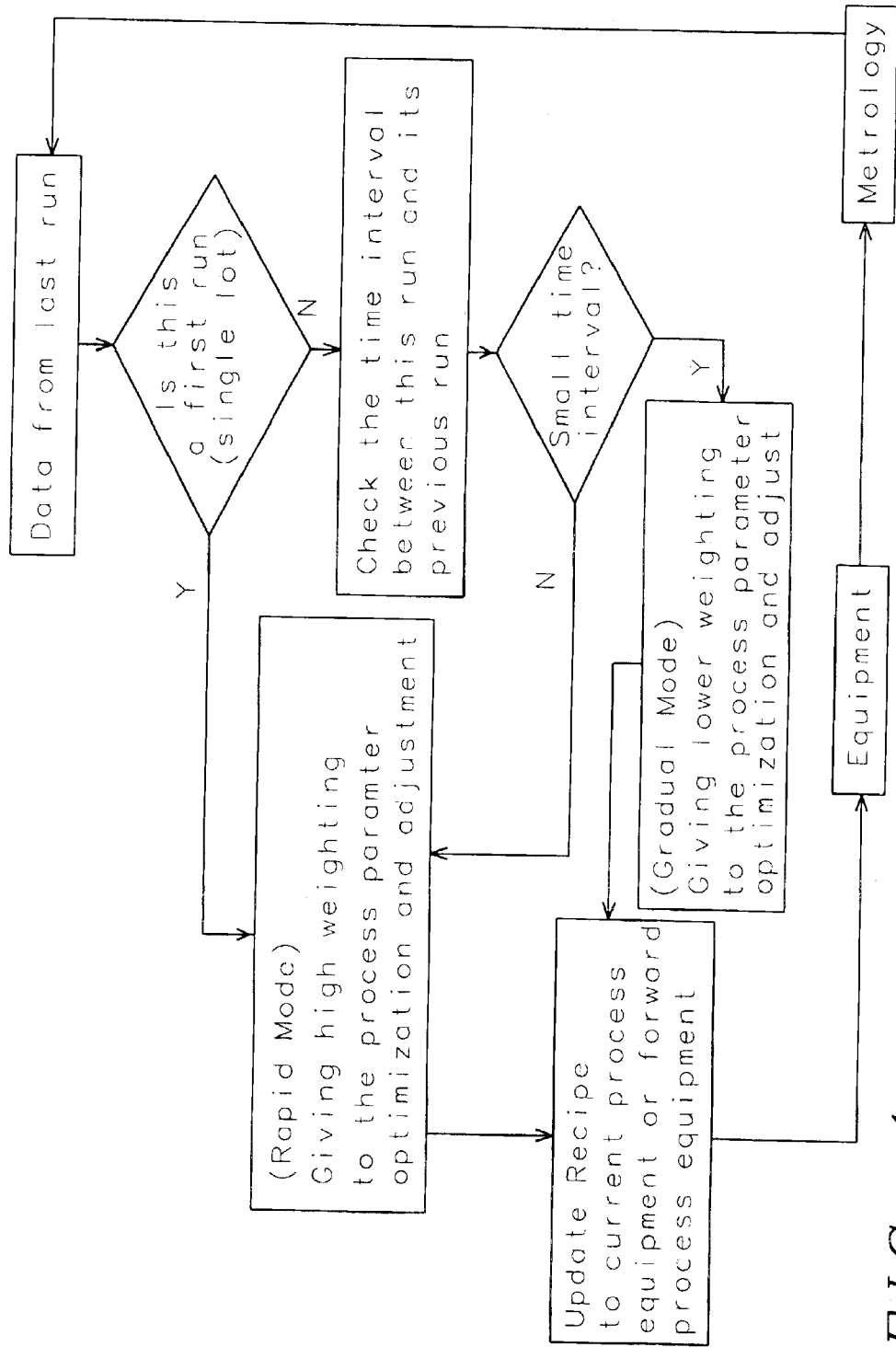
FIG. 1 illustrates a flow chart of the APC system of the present invention.

The process of the present invention provides an advanced process control (APC) system for use in a foundry or any other application in which there are many products of many different types to be made with a low work-in-process (WIP) number. The present invention may use an APC system such as taught in U.S. patent applications Ser. Nos. 10/313,501 and 10/749,698 or another APC system may be used. It is a key feature of the present invention that a new concept for controlling feedback data is implemented.

For example, such parameters as chemical mechanical polishing (CMP) pad wear, chemical vapor deposition (CVD) source depletion, and critical dimension (CD) and overlay can be measured and recipes adjusted to tune these parameters. The photolithography process will be used to demonstrate the feedback control scheme of the present invention, but it will be understood by those skilled in the art that the invention is not limited to the photolithography process, but that the feedback control scheme of the present invention can be used in any integrated circuit manufacturing process.

One quality characteristic of the photolithography process is critical dimension (CD). According to physical knowledge, CD is a function of the input recipe and the exposure dose (E). The increment or decrement of the exposure dose will lead to a proportional change in CD. Another quality characteristic of the photolithography process is overlay. Overlay control involves measuring misalignment between two successive patterned layers on the surface of a semiconductor device. Overlay depends upon many parameters, such as rotation, translation in the x- and y-axes, magnification, and so on.

In order to meet the requirements of advanced integrated circuit technology, we need to set up an advanced automation system to control processes in the foundry, for example. In APC, weighting is applied to make changes in subsequent processing based on previous measurements. A common technique is Experimental Weighted Moving Average (EWMA). Integrated device manufacturers typically use lot number weighting to determine if rapid mode or gradual mode is to be used for feedback correction. This method is not suitable for the situation in a foundry. For example, one lot of a particular product may be processed, then a month later, the next lot of the product may be processed. If the time between the first and second lot is long, the weighting will be high for the lots' correction; this is rapid mode correction. The process must be changed quickly back to that used at the time of processing of the earlier lot. If the time between the first and second lot is short, the weighting will be low for the lots' correction; this is gradual mode correction.

FIG. 1 is a flow chart of an advanced process control system used in the process of the present invention. The user can set up the APC system to provide weighting based on time interval for each parameter setting (such as CD or overlay, for example). For example, for the CD parameter setting, energy is to be adjusted. Weights can be assigned based on time interval between lots of each particular type. For example, a single occurrence of a particular lot may be given a high weighting. For example, a first lot of a particular product is a "single lot". A high weighting will be given to its derived adjustment for its process deviation. For example, a time interval exceeding 120 hours may be given a slightly lower weighting. Time intervals of between 120 and 24 hours might have the next lowest weighting and a time interval of less than 24 hours may have the lowest weighting. The smallest time interval would have the lowest weighting because the equipment should not shift much in the short term.

Lot types are identified depending on the characteristic of the process parameter of interest. For example, lots may be identified by product type, processing of the same layer, using the same mask, and so on.

The time interval feedback weighting APC system of the present invention has been implemented. The process capability index (CPK) measured by statistical process control (SPC) has improved by at least 20% after implementation of the APC process of the present invention. Record low rework rates have also been seen.

The process of the present invention is useful especially in facilities where multiple products are made in mixed mode and where the numbers of each product are relatively small. Feedback is based on product type, for example, and weighted by the time interval between processing of the particular product type.

While the invention has been particularly shown and described with reference to the preferred embodiments thereof, it will be understood by those skilled in the art that various changes in form and details may be made without departing from the spirit and scope of the invention.

What is claimed is:

1. A method of process control comprising:
   fabricating a plurality of products wherein said products are tracked by said process control method based on type;
   detecting variation in a parameter;
   determining adjustment speed of a process recipe based on a time interval weighting wherein said time interval is defined as the time between processing of lots of the same said type; and
   updating a process recipe at said adjustment speed to decrease said variation of said parameter.

2. The method according to claim 1 wherein said type is selected from the group comprising: product type, processing layer, and mask used.

3. The method according to claim 1 wherein said time interval weighting assigns a higher weighting to a longer time interval.

4. The method according to claim 3 wherein a higher weighting determines a rapid mode adjustment and wherein a lower weighting determines a gradual mode adjustment.

5. The method according to claim 1 wherein said parameter is selected from the group consisting of: chemical mechanical process (CMP) pad wear, chemical vapor deposition (CVD) source depletion, critical dimension, and overlay.

6. The method according to claim 1 wherein said parameter is critical dimension and wherein said process recipe is exposure dosage.

7. The method according to claim 1 wherein said parameter is overlay and wherein said process recipe is selected from the group consisting of: rotation, x-axis translation, y-axis translation, and magnification.

8. A method of process control comprising:
   fabricating a plurality of products wherein said products are tracked by said process control method based on product type;
   detecting variation in a parameter;
   determining adjustment speed of a process recipe based on a time interval weighting wherein said time interval is defined as the time between processing of lots of the same said product type; and
   updating a process recipe at said adjustment speed to decrease said variation of said parameter.

9. The method according to claim 8 wherein said time interval weighting assigns a higher weighting to a longer time interval.

10. The method according to claim 9 wherein a higher weighting determines a rapid mode adjustment and wherein a lower weighting determines a gradual mode adjustment.

11. The method according to claim 8 wherein said parameter is selected from the group consisting of: chemical mechanical process (CMP) pad wear, chemical vapor deposition (CVD) source depletion, critical dimension, and overlay.

12. The method according to claim 8 wherein said parameter is critical dimension and wherein said process recipe is exposure dosage.

13. The method according to claim 8 wherein said parameter is overlay and wherein said process recipe is selected from the group consisting of: rotation, x-axis translation, y-axis translation, and magnification.

14. A method of process control comprising:
   providing a plurality of tools and a plurality of products to be run on said tools;
   identifying tool effects on a parameter for each tool and product effects on said parameter for each product;
   calculating a desired recipe for each product on each tool based on said tool effects and said product effects;
   thereafter running said plurality of products on said plurality of tools wherein said products are tracked by said process control method based on product type;
   thereafter detecting variation in a parameter;
   determining adjustment speed of said desired recipe based on a time interval weighting wherein said time interval is defined as the time between processing of lots of the same said product type; and
   updating said desired recipe to decrease said variation of said parameter at said adjustment speed.

15. The method according to claim 14 wherein said product effects and said tool effects are estimated based on past data.

16. The method according to claim 14 wherein each said desired recipe is calculated for known combinations of tools and products.

17. The method according to claim 14 wherein for unknown combinations of tools and products, each said desired recipe is estimated using an expectation maximization algorithm.

18. The method according to claim 14 wherein said time interval weighting assigns a higher weighting to a longer time interval.

19. The method according to claim 18 wherein a higher weighting determines a rapid mode adjustment and wherein a lower weighting determines a gradual mode adjustment.

20. The method according to claim 14 wherein said parameter is selected from the group consisting of: chemical mechanical process (CMP) pad wear, chemical vapor deposition (CVD) source depletion, critical dimension, and overlay.

21. The method according to claim 14 wherein said parameter is critical dimension and wherein said process recipe is exposure dosage.

22. The method according to claim 14 wherein said parameter is overlay and wherein said process recipe is selected from the group consisting of: rotation, x-axis translation, y-axis translation, and magnification.

23. A method of process control of a photolithography process comprising:

fabricating a plurality of products wherein said products are tracked by said process control method based on product type;

detecting variation in critical dimension;

determining adjustment speed of an exposure dose recipe based on a time interval weighting wherein said time interval is defined as the time between processing of lots of the same said product type; and updating said exposure dose recipe at said adjustment speed to decrease said variation of said critical dimension.

24. The method according to claim 23 wherein said time interval weighting assigns a higher weighting to a longer time interval.

25. The method according to claim 23 wherein a higher weighting determines a rapid mode adjustment and wherein a lower weighting determines a gradual mode adjustment.

* * * * *